Dec. 12, 1967
G. HIBARGER
3,357,192
BREAKWATERS
Filed July 18, 1966
2 Sheets-Sheet 1
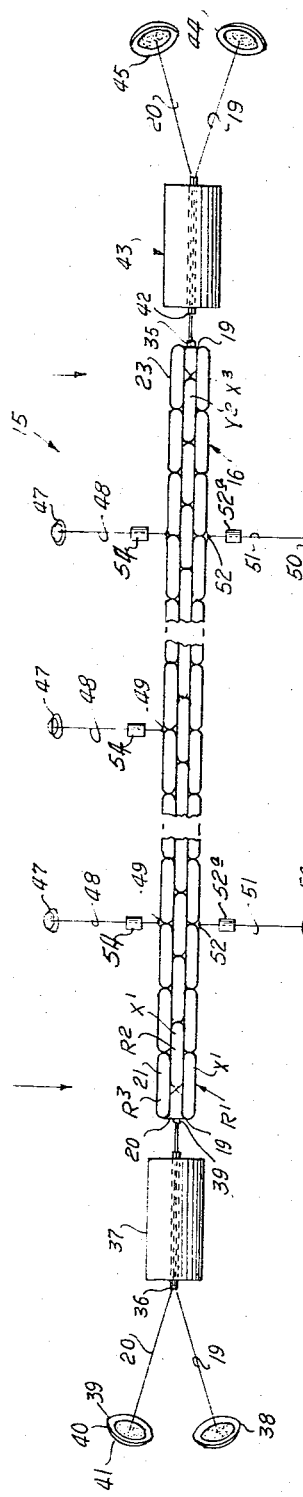
Fig.1
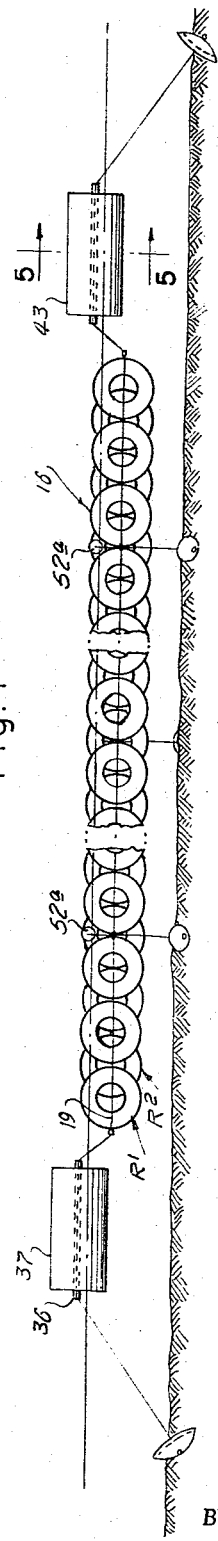
Fig.2
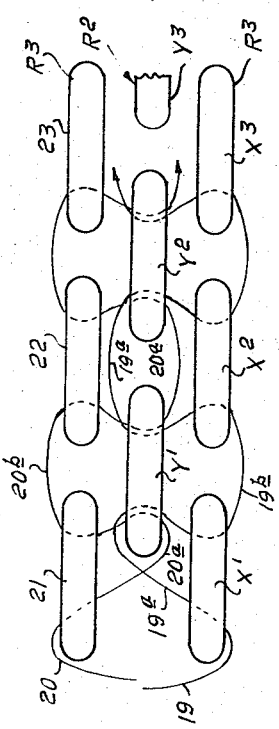
Fig.4
Fig.3
INVENTOR
George Hibarger
BY
*Hastings Ackley
and
Walter J. Jackson*
ATTORNEYS

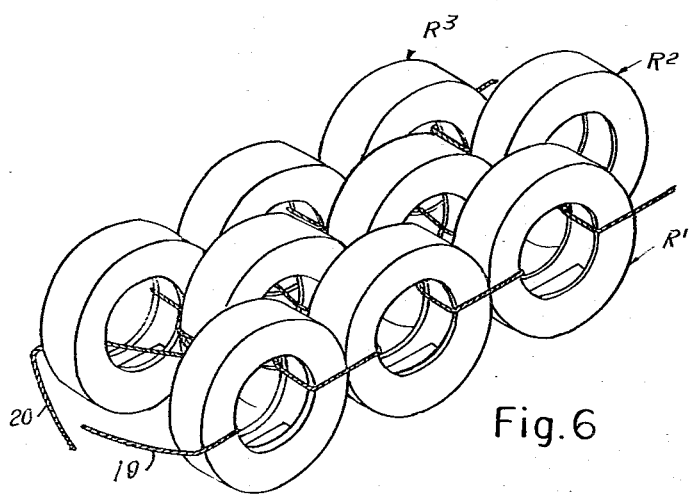
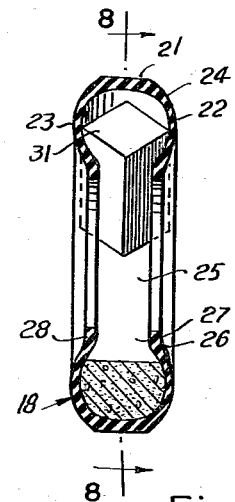
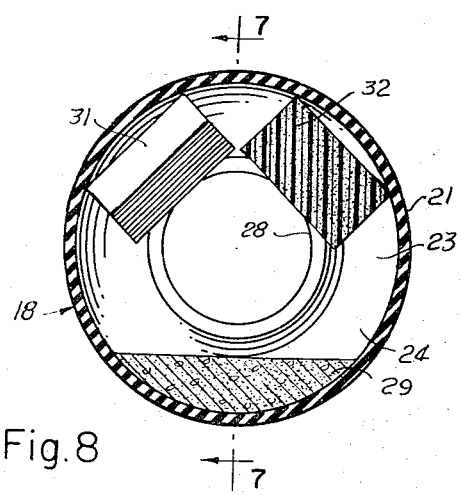
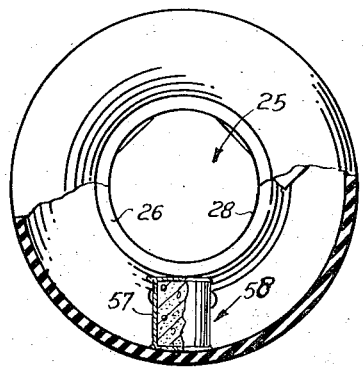
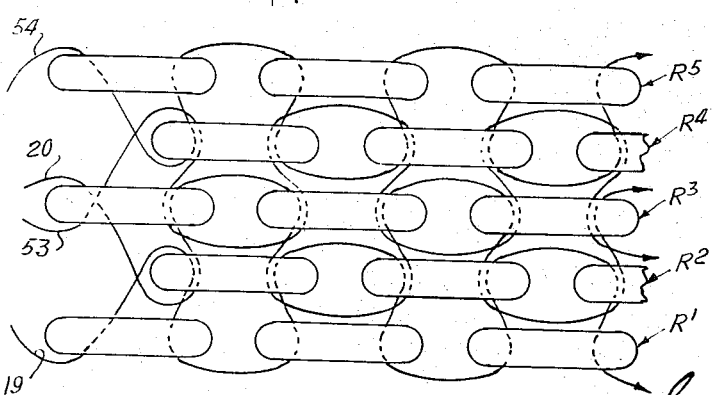
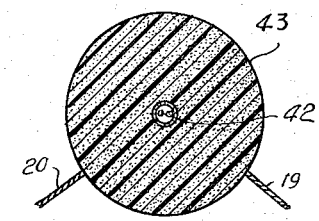
INVENTOR
George Hibarger Patented Dec. 12, 1967

3,357,192
BREAKWATERS
George Hibarger, Mead, Okla. 73449
Filed July 18, 1966, Ser. No. 565,903
13 Claims. (Cl. 61—5)

This invention relates to breakwaters and more particularly to a floating breakwater.

An object of this invention is to provide a new and improved floating breakwater for protecting harbors, floating docks, marinas, marine installations and the like by reducing the amplitude of the waves of the water in which the breakwater is partially submerged.

Another object is to provide a floating breakwater having means extending downwardly into the water for breaking up or attenuating the rotary circulation of water beneath the surface thereof which gives rise to the surface waves.

Still another object is to provide a floating breakwater formed of components which are easily assembled at the sight of installation and which has sufficient flexibility to permit limited movement of different portions thereof as the water in which it is afloat is subjected to surface disturbances, such as waves, swells, wakes of speeding boats and the like to minimize strains of the breakwater due to such disturbances.

A further object is to provide a breakwater formed of a plurality of annular or ring-shaped members, such as truck or automobile tires, which are themselves flexible and resilient and are flexibly secured to one another by elongate flexible members, such as wire rope or cable, which are interwoven through the tires to secure them to one another.

A still further object is to provide a breakwater of the type described wherein the tires are provided at their lower portions with weights and at their upper portions with buoyant means to cause them to assume vertical positions when placed in water and have major portions thereof submerged in the water.

Another object is to provide a floating breakwater having an elongate flexible buoyant body formed of a plurality of longitudinal rows of tires, with the tires of each row disposed in overlapping relationship to the tires of immediately adjacent rows and secured to one another in such overlapped relationship and with their adjacent side surfaces in abutting relationship by flexible members interwoven through the tires.

Still another object is to provide a breakwater wherein the flexible members at opposite ends of flexible body are provided with end anchors to hold the breakwater against displacement.

Still another object is to provide a breakwater having float means secured to the flexible members between the ends of the body and the anchors which have major portions thereof above the water to indicate the location of the breakwater and to prevent the body from being pulled under water when it is subjected to forces tending to move it longitudinally relative to the end anchors.

Additional objects and advantages of the invention will be readily apparent from the reading of the following description of a device constructed in accordance with the invention, and reference to the accompanying drawings thereof, wherein:

FIGURE 1 is a schematic top plan view of the breakwater embodying the invention;

FIGURE 2 is a vertical side view of the breakwater;

FIGURE 3 is a fragmentary schematic view showing the manner in which the flexible members are interwoven through the annular members or tires to secure them to one another to form the elongate flexible body;

FIGURE 4 is a fragmentary top view showing the rows of tires in the abutting relationship to which they are moved when the flexible members are tensioned longitudinally;

FIGURE 5 is a vertical sectional view taken on line 5—5 of FIGURE 2;

FIGURE 6 is a fragmentary perspective view showing the manner in which the flexible members are interwoven through the tires;

FIGURE 7 is a vertical sectional view of one of the tires taken on line 7—7 of FIGURE 8;

FIGURE 8 is a vertical sectional view taken on line 7—7 of FIGURE 8;

FIGURE 9 is a side view, with some portions broken away, of a tire having a different weight in its lower portion; and, FIGURE 10 is a fragmentary top view showing the manner in which the flexible breakwater body may be formed of more than three rows of tires.

Referring now particularly to FIGURES 1 through 8 of the drawings, the breakwater 15 includes a flexible buoyant elongate body 16 which floats in water with all but its topmost portion submerged therein. The body is formed of three parallel longitudinal rows R1, R2 and R3 of annular members 18 which are secured together in the relationship illustrated in FIGURES 1 and 2 by a pair of elongate flexible members 19 and 20, such as steel ropes or cables.

The annular members may be used truck or automobile tires. The outer peripheral portions 21 and the side portions 22 and 23 of each tire define an annular cavity 24 which opens to the central opening 25 of the tire through an annular passage 26 defined by the annular beads or flanges 27 and 28 at the inner edges of the side portions 22 and 23, respectively. The anchor passage 26 is of smaller width than the width of the cavity so that a weight 29 of concrete or the like positioned in a lower portion of the cavity is held against displacement therefrom since its width is greater than that of the annular passage. The weight 29 may be formed by pouring a predetermined quantity of plastic concrete into the tire and then permitting the concrete to set or harden while a tire is held in the upright vertical position illustrated in FIGURES 7 and 8.

Suitable buoyant means, such as a pair of float blocks 31 and 32 of an expanded plastic such as polystyrene, are disposed in the upper portion of the cavity and cooperate with the weight 29 to cause the tire to float in a vertical position in the water with the central axis of the tire extending horizontally and with most of the tire submerged in the water. The float blocks 31 and 32 may be square in cross-sectional configuration and are inserted into the tire body by flexing the flanges 27 and 28 outwardly to permit the insertion of the blocks into the cavity. Once the float blocks are in a position in the cavity, the flanges are released to move back resiliently to their normal positions. Since the cross sectional dimensions of the blocks are greater than the width of the annular passage 26 of the tire, the float blocks are held by the inner portions of the tire against displacement from the cavity. In addition the force of the water, when the tire is disposed in the water, tends to hold the buoyant blocks in the upper portion of the tire body and against displacement therefrom.

The tires X of row R1 are secured to the tires Y of row R2 of the breakwater body 16, with the side surfaces of the tires X abutting the side surfaces of the tires Y, by the flexible member 19 which is interwoven through the central openings of the tires of rows R1 and R2 in such manner that it has loops 19a which extends inwardly through the central openings of the tires X of row R1 and loops 19b which extend laterally outwardly through the central opening of the tires Y of row R2.

For example, the flexible member 19 at the left end of the body 16 extends laterally inward through the central opening of the first tire X1 of row R1, about the tire Y1 of row R2 and laterally outwardly through the central opening thereof to form a loop 19a, then through the central openings of the tire X1 and back inwardly through the central openings of the tires X2 and Y1 to form a loop 19b, and then about the tires Y1 and Y2 and laterally outwardly through the central openings of the tires Y2 and X2 to form a second loop 19a, and so on. The flexible member 20 is similarly interwoven through openings of the tires Y and Z in such manner that it has laterally inwardly extending loops 20a which extend laterally inwardly through the central openings of the tires Z and about the tires Y and laterally outwardly extending loops 20b which extend outwardly of the central openings of the tires Y1 and through the central openings and about the tires Z as is illustrated in FIGURES 3, 4 and 6.

When the flexible members 19 and 20 are thus interwoven through the three rows of tires, they are placed in tension by pulling outwardly on opposite ends thereof and the tires are then moved to the positions relative to each other illustrated in FIGURES 1, 2 and 4 wherein the tires of adjacent rows overlap one another longitudinally so that portions of the tires X of row R1 at least partially block the central openings of the adjacent tires Y of row R2 and portions of the tires Y of row R2 at least partially block the central openings of adjacent tires X of row R1. The tires Y and Z of rows R2 and R3 similarly at least partially block or close each others central openings. The opposite ends of the flexible members, after they have been placed in tension, are secured to one another at opposite ends of the rows of tires by suitable fasteners or clamps 34 and 35.

The assembly 16 formed of the three rows of tires is flexible and resilient both laterally and perpendicularly, and is to some extent resilient and flexible longitudinally since each tire is flexible and resilient and may stretch or deform and since the tires may bend or deform at the locations of their contact with the flexible members because the flexible members contact the tires at locations between the weights 29 and the float blocks 31 and 32. The side portions of each tire thus may flex, bend or deform inwardly toward one another at the locations of contact with the flexible members.

The flexible members extend from one end of the elongate body 16 and the fastener 34 through a rigid tubular member 36 of steel or the like of a float 37 formed of a buoyant substance, such as expanded polystyrene, and at the ends remote from the float 37 have anchors 38 and 39 secured thereto. The anchors may be formed of iron or steel bodies 40 of arcuate form in which a mass of concrete, lead or other heavy substance may be secured. The flexible members extend from the other end of the body 16 and the clamp 35 through the rigid tubular central member 42 of a float 43, which may be identical in structure and form to the float 37, and have anchors 44 and 45 secured thereto.

The floats 37 and 43 have major portions thereof projecting upwardly through the water and thus indicate the location of the breakwater since the body 16 has only a small portion thereof exposed above the water. The floats also prevent downward forces from being applied to opposite ends of the body 16 if the body is moved relative to end anchors which would occur if the floats were not secured to the flexible members between the ends of the body and the end anchors.

Side anchors 47 are secured to the tires Z of row R3 by suitable flexible members or cables 48 each of which is looped about a pair of adjacent tires Z secured thereto by a suitable clamp 49. Similar side anchors 50 are secured by cables 51 and clamps 52 to the tires X of row R1. The side anchors, such as the anchors 47 on the side of the breakwater in the direction of prevailing winds are preferably spaced a shorter distance apart than the anchors 47b which are disposed on the leeward side of the breakwater. For example, the side anchors 47a may be spaced 60 feet apart and the side anchors 47b may be spaced 120 feet apart along the assembly 16. Floats 52a and 54 which may be identical to the floats 37 are mounted on the cables 51 and 48, respectively. The floats 52a and 54 prevent the body from being pulled under water when lateral wind or wave forces are applied thereto.

It will be apparent that the breakwater is easily and quickly assembled at the location of its use from relatively inexpensive components, as for example, used truck tires and used steel cables. It will also be apparent that the breakwater body is flexible and resilient to a limited degree since the tires are resilient and since the means which secure the tires to one another are themselves flexible so that the body 16 may flex as required by the disturbances or movement of the water in which it is afloat to relieve itself to a substantial degree of the stresses imposed thereon by such disturbances.

It will further be seen that since the tires are almost wholly submerged in the water and since they overlap one another, the rotary circulation of the water immediately beneath the surface about substantially horizontal axes which extend perpendicular to the direction of movement of the waves and which causes and sustains wave action, is broken up or attenuated by the breakwater and the amplitude of the waves in the area of the water protected by the breakwater is greatly decreased.

If desired instead of pouring plastic concrete into the tires to form the weight 29, a suitable weight 58 may be inserted into the annular cavity 27 of the inner member or tire. For example, the weight may be a container or can 57, such as a used paint can, filled with concrete or other heavy substance. Such cans are of greater diameter than the width of the tire passage 26 so that when such cans are inserted into the tire cavity by pulling outwardly on the side flanges 27 and 28, the side flanges move back to their normal positions and extend over the upper ends of the cans and thus hold them against displacement from the cavity. It will be apparent of course that the weight of the can itself will tend to hold it in proper position in the tire.

It will be apparent that while the breakwater body 16 has been shown to be formed of three rows of tires secured to one another by two cables 19 and 20, the number of rows in the body may be increased as desired, as illustrated in FIGURE 10. The tires of row R4 are then secured to the tires of row R3 by a flexible member or cable 53 about which extends through the tires of rows R3 and R4 in the same manner as the flexible member 19 extends about the tires of rows R1 and R2 and the tires of row R5 are secured to the tires of R4 by a flexible member R4 in the same manner as the flexible member 20 secures the tires of row R3 to the tires of row R2.

It will now be seen that a new and improved breakwater has been illustrated and described which may be easily and quickly assembled at the location of installation and that the transverse width of the breakwater body may be easily increased as desired by connecting thereto additional rows of tires.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A floating breakwater including: a main body comprising a plurality of longitudinal parallel rows of annular members, said annular members having central apertures whose central horizontal axes extend perpendicularly relative to said rows, said annular members being adapted to float partly submerged in vertical positions, and an elongate flexible member interwoven through the annular members of each pair of adjacent rows holding the annular members of adjacent rows in longitudinally overlapped relation, overlapped portions of annular members of each row closing at least partially the central apertures of the annular members of an adjacent row.

2. The breakwater of claim 1, wherein each of said annular members has an annular cavity and an annular passage of narrower width than the width of said cavity opening from said cavity to its central aperture; a weight in a lower portion of said cavity and buoyant float means in an upper portion of said cavity for holding said annular member in a partially submerged vertical floating position in water.

3. The breakwater of claim 1, and end anchor means connected to said flexible member at opposite ends of said rows for anchoring said breakwater.

4. The breakwater of claim 3, said float means secured to said flexible members between said anchor means and said rows.

5. The breakwater of claim 4, and side anchor means connected to and spaced laterally from opposite sides of said main body for holding said main body against lateral displacement.

6. A floating breakwater including: a main body comprising a plurality of longitudinal parallel rows of tires, each of said tires having a central opening, an internal annular cavity and an annular passage of narrower width than said cavity opening from said cavity to said central opening; means disposed in said cavity of each of said tires for causing said tires to float partly submerged in vertical positions when placed in water; flexible means interwoven through the central openings of said tires for holding the tires of adjacent rows in longitudinally overlapped relation, overlapped portions of annular members of each row closing at least partially to central opening of the tires of an adjacent row.

7. The breakwater of claim 6, and end anchor means secured to said body at opposite ends thereof and spaced therefrom.

8. The breakwater of claim 6 wherein said means in the cavity of said tires comprises a weight in the lower portion of the tire and buoyant float means in the upper portion of the cavity.

9. The breakwater of claim 8 wherein said flexible means comprises elongate flexible members interwoven through the tires of adjacent rows.

10. The breakwater of claim 9, and end anchor means secured to said flexible members at opposite ends of said flexible members and spaced from opposite ends of said body.

11. The breakwater of claim 10, and float means secured to said flexible members between said anchor means and said rows.

12. The breakwater of claim 10, and side anchor means connected to and spaced laterally from opposite sides of said body for holding said body against lateral displacement.

13. The breakwater of claim 12, wherein said side anchor means are connected to said body by flexible members, and float means secured to said flexible member between said side anchor means and said body.

References Cited
UNITED STATES PATENTS

| | | | |
|---|---|---|---|
| 2,388,171 | 10/1945 | McVitty | 61—1 X |
| 2,658,350 | 11/1953 | Magill | 61—5 |
| 2,920,846 | 1/1960 | Lingafelter. | |
| 2,972,233 | 2/1961 | Askevoid | 61—5 |
| 3,029,606 | 4/1962 | Olsen | 61—5 |
| 3,276,210 | 10/1966 | Stitt | 61—5 |

EARL J. WITMER, *Primary Examiner.*